(12) United States Patent
Reichen et al.

(10) Patent No.: US 11,592,367 B2
(45) Date of Patent: Feb. 28, 2023

(54) METHOD FOR ANALYZING AND SELECTING A SPECIFIC DROPLET AMONG A PLURALITY OF DROPLETS AND ASSOCIATED APPARATUS

(71) Applicant: HIFIBIO SAS, Paris (FR)

(72) Inventors: Marcel Reichen, Waedenswill (CH); Raphael Clément Li-Ming Doineau, Paris (FR); Sami Ellouze, Chatenay Malabry (FR)

(73) Assignee: HIFIBIO SAS, Paris (FR)

( * ) Notice: Subject to any disclaimer, the term of this patent is extended or adjusted under 35 U.S.C. 154(b) by 698 days.

(21) Appl. No.: 16/478,869

(22) PCT Filed: Jan. 18, 2018

(86) PCT No.: PCT/EP2018/051245
§ 371 (c)(1),
(2) Date: Jul. 18, 2019

(87) PCT Pub. No.: WO2018/134323
PCT Pub. Date: Jul. 26, 2018

(65) Prior Publication Data
US 2019/0376879 A1 Dec. 12, 2019

(30) Foreign Application Priority Data
Jan. 18, 2017 (EP) .................................... 17305052

(51) Int. Cl.
*G01N 1/30* (2006.01)
*B01L 3/00* (2006.01)
(Continued)

(52) U.S. Cl.
CPC .......... *G01N 1/30* (2013.01); *B01L 3/502715* (2013.01); *B01L 3/502784* (2013.01);
(Continued)

(58) Field of Classification Search
CPC ....... B01L 3/502784; B01L 2200/0673; B01L 2200/0652; B01L 2300/0864;
(Continued)

(56) References Cited

U.S. PATENT DOCUMENTS

2012/0015382 A1 1/2012 Weitz et al.
2017/0307626 A1* 10/2017 Griffiths ............... G01N 33/543

FOREIGN PATENT DOCUMENTS

WO WO-2010005593 A1 1/2010
WO WO-2016059182 A1 * 4/2016 ........ B01L 3/502715

OTHER PUBLICATIONS

Pompey, Shanica, et al., "Quantitative Fluorescence Co-localization to Study Protein-Receptor Complexes", Protein-Ligand Interactions : Methods and Applicat, Humana Press, USA, pp. 439-453 (Jan. 2013).

* cited by examiner

*Primary Examiner* — Dean Kwak
(74) *Attorney, Agent, or Firm* — McCarter & English, LLP; Yu Lu; James M. Alburger

(57) ABSTRACT

The present invention relates to a method for analyzing and selecting a specific droplet among a plurality of droplets (4), comprising the following steps: —providing a plurality of droplets (4), —for a droplet (4) among the plurality of droplets, measuring at least two optical signals, each optical signal being representative of a light intensity spatial distribution in the droplet for an associated wavelength channel, —calculating a plurality of parameters from the optical signals, —determining a sorting class for a droplet according to calculated parameters, —sorting said droplet according to its sorting class, wherein the plurality of parameters comprises the coordinates of a maximum for each optical signal and a co-localization parameter and the at least two calculated parameters used for the determining step comprises the co-localization parameter.

11 Claims, 8 Drawing Sheets

(51) Int. Cl.
*G01B 11/04* (2006.01)
*G01B 11/14* (2006.01)
*G01N 15/14* (2006.01)
*G01N 15/00* (2006.01)
*G01N 21/03* (2006.01)
*G01N 21/64* (2006.01)

(52) U.S. Cl.
CPC ............ *G01B 11/046* (2013.01); *G01B 11/14* (2013.01); *G01N 15/1459* (2013.01); *G01N 15/1484* (2013.01); *B01L 3/502761* (2013.01); *B01L 2200/0647* (2013.01); *B01L 2200/0652* (2013.01); *B01L 2200/0673* (2013.01); *B01L 2300/0645* (2013.01); *B01L 2300/0864* (2013.01); *B01L 2400/0487* (2013.01); *G01N 2015/003* (2013.01); *G01N 2015/149* (2013.01); *G01N 2021/035* (2013.01); *G01N 2021/6417* (2013.01); *G01N 2021/6441* (2013.01)

(58) Field of Classification Search
CPC ....... B01L 2400/0487; B01L 3/502761; B01L 2300/0816; B01L 3/502715; B01L 2200/0636; B01L 2200/0647; B01L 2300/0645; B01L 3/502776; C12Q 2563/149; C12Q 1/6816; C12Q 2565/629; G01N 2015/003; G01N 1/30; G01N 2015/149; G01N 2021/035; G01N 2021/6417; G01N 2021/6441; G01B 11/046; G01B 11/14
See application file for complete search history.

METHOD FOR ANALYZING AND SELECTING A SPECIFIC DROPLET AMONG A PLURALITY OF DROPLETS AND ASSOCIATED APPARATUS

CROSS-REFERENCE TO RELATED APPLICATIONS

This application is a national stage filing under 35 U.S.C. § 371 of International Application No. PCT/EP2018/051245, filed on Jan. 18, 2018, which claims the benefit of and priority to European Patent Application No. 17305052.7, filed Jan. 18, 2017, the contents of all of which are incorporated by reference here in their entirety. International Application No. PCT/EP2018/051245 was published under PCT Article 21(2) in English.

The present invention concerns a method for analyzing and selecting a specific droplet among a plurality of droplets.

In particular, the process is intended to screen and select the droplets that comprise a specific target element. For example, the specific target element can be the product of a biological reaction or a chemical reaction.

The method is used to select microfluidic droplets. By "microfluidic", it is generally meant that the dimensions of the passages in which the droplets or fluid circulates are smaller than one millimeter and are comprised for example between 1 µm and 1 mm.

Each droplet can be considered as a micro-container, wherein chemical or biological reactions occur. They can be used for specific synthesis, screening of products or diagnosis.

In many assays, there is a need to sort droplets before the analysis in order to enhance the efficiency of the assay. In other assays, there is a need to sort the droplets after a number of chemical, physical or biological reactions in order to collect specific droplet content.

For example, to test in parallel the activity or the properties of the large number of variants of chemical or biological micro-reactors, it is known to distribute the micro-reactors in droplets of an emulsion, then to conduct a chemical or biological reaction in each of the micro-reactors. It is then necessary to separate the droplets according to the product they contain, in particular to evaluate and isolate the reaction conditions and the micro-reactors having led to a significant reaction.

To isolate the droplets in which significant reaction has occurred, it is known to place selective fluorescent markers that are active when the significant reaction has occurred.

Then, the droplets are sorted manually or using automatic sorting machines to separate those which reacted, for example, through microfluidic or flow cytometry techniques. For example, a fluorescent activated cell sorter (FACS) measures a fluorescence signal within the droplets. Such techniques are relatively complex and expensive.

However, in specific assays, it is also important to differentiate droplets based on more complex criteria. For example, it is important to distinguish droplets containing an aggregate of biological entities from droplets containing the same amount of single entities but not aggregated. Indeed, aggregation can provide risk of false positive selection or false negative rejection in some tests.

One aim of the invention is therefore to provide a method for analyzing and selecting a specific droplet with a higher fidelity than existing systems.

To this aim, the subject-matter of the invention is a method for analyzing and selecting a specific droplet among a plurality of droplets, comprising the following steps:

providing a plurality of droplets,
for a droplet among the plurality of droplets, measuring at least two optical signals, each optical signal being representative of a light intensity spatial distribution in the droplet for an associated wavelength channel,
calculating a plurality of parameters from the at least two optical signals,
determining a sorting class for a droplet according to at least two calculated parameters,
sorting said droplet according to its sorting class,
wherein the plurality of parameters comprises the coordinates of a maximum for each optical signal and a co-localization parameter and the at least two calculated parameters used for the determining step comprises the co-localization parameter.

The method for analyzing and selecting a specific droplet among a plurality of droplets according to the invention may comprise one or more of the following feature(s), taken solely, or according to any technical possible combinations:

a co-localization parameter is calculated by comparing the position corresponding to the maximum intensity (as maximum peak intensity or an integrated signal or ratio of between a maximum value of an optical signal and an integration value of said optical signal) of a first optical signal among the at least two optical signals to the position corresponding to the maximum intensity of a second optical signal among the at least two optical signals; the colocalization parameter can be rationalized by the size of the droplet, taking into account the time interval between the maximum signal intensity of the at least two different fluorescent channels. The value is thus bounded in between 0 and 1 (or 0% and 100%), with a value of 1 (or 100%) being the perfect colocalization of the two maximum intensity signal.

the plurality of parameters comprises at least one of the following parameters:

a droplet width,
an integration of an optical signal,
a ratio between a maximum value of an optical signal and an integration value of said optical signal,
the coordinates of a local maximum for an optical signal,
the number of local maxima in a droplet for an optical signal,
the calculation of the derivative of an optical signal and the calculation of the second derivative for an optical signal;
a first optical signal among the at least two optical signals comprises a plurality of local maxima, the plurality of parameter comprises a multipeak co-localization parameter calculated between the first optical signal and a second optical signal comprising a local maximum, the multipeak co-localization parameters being calculated with the following steps:

for each local maximum of the first optical signal, calculating an intermediate co-localization parameter, by comparing the position of the local maximum of the second signal to the position of said local maximum of the first optical signal,
comparing the intermediate co-localization parameters, the multipeak co-localization parameter being the lowest intermediate co-localization parameter;

a co-localization parameter in a droplet is normalized by the droplet width;
the step of measuring is performed for at least two droplets of the plurality of droplets and the plurality of parameters comprises the spacing between the two droplets;

during the determining step, at least a calculated parameter is compared to predetermined threshold values;

during the measuring step, at least three optical signals are measured, and wherein a plurality of co-localization parameters are calculated by comparing the position of the maximum of the optical signals two by two;

a method as previously described comprising the following step:

providing an apparatus comprising a channel adapted for a flow of droplets, the apparatus comprising a detection area, and a sorting area, the plurality of droplets circulating in the channel, carrying out a measurement for a droplet flowing in the detection area;

a step of capturing a picture of the droplet during the measuring step;

at least a droplet of the plurality of droplets comprises a first element, the first element being fluorescent in a wavelength channel associated to a first optical signal among the at least two optical signals, and wherein at least a droplet of the plurality of droplets comprises a second element, the second element being fluorescent in a second wavelength channel associated to a second optical signal among the at least two optical signals;

the first and second element are chosen in the group of elements consisting of a cell, a fluorescently labelled protein, a cell labelling reagent, a fluorescently labeled antigen, a fluorescently labelled antibody, a particle coated with a biological entity, a nucleic acid, a peptide and a chemical drug.

The invention also concerns an apparatus for analyzing and selecting a specific droplet among a plurality of droplets comprising:

a detection assembly adapted to measure, for a droplet, at least two optical signals, each optical signal being representative of a light intensity spatial distribution in the droplet for an associated wavelength channel, a calculator for calculating a plurality of parameters from the at least two optical signals, a selecting unit for determining a sorting class for the droplet according to at least two calculated parameters, a sorting unit for sorting the droplet according to its sorting class, wherein the plurality of parameter comprises the coordinate of the maximum for each optical signal and a co-localization parameter and the at least two calculated parameters comprises the co-localization parameter.

The apparatus according to the invention may comprise the following features:

the detection assembly comprises a light source and at least a visible light sensitive detector.

The invention will be better understood, upon reading of the following description, given solely as an example, and made in view of the following drawings, in which.

Figure 5:
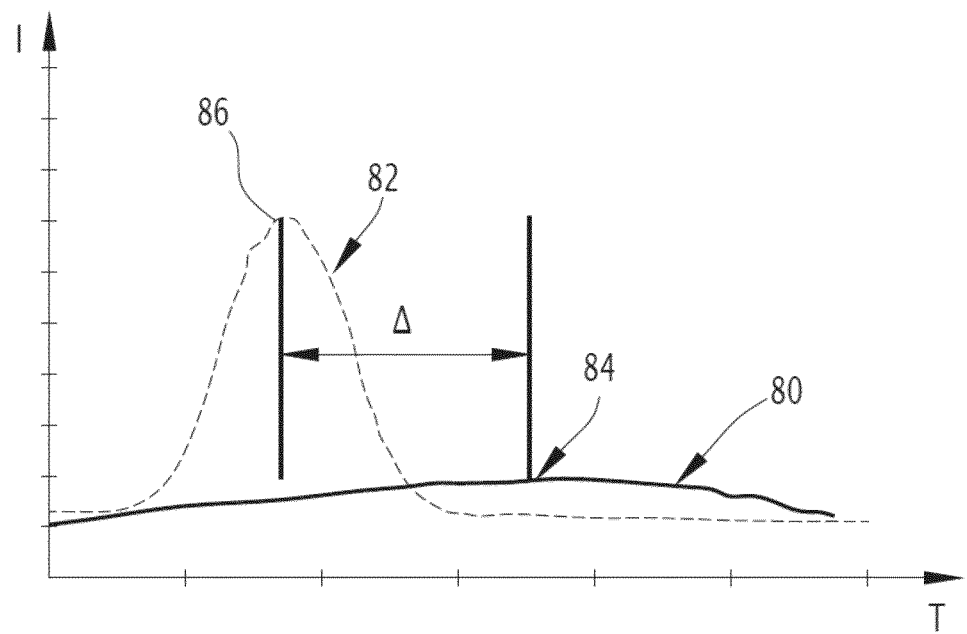
Figure 6:
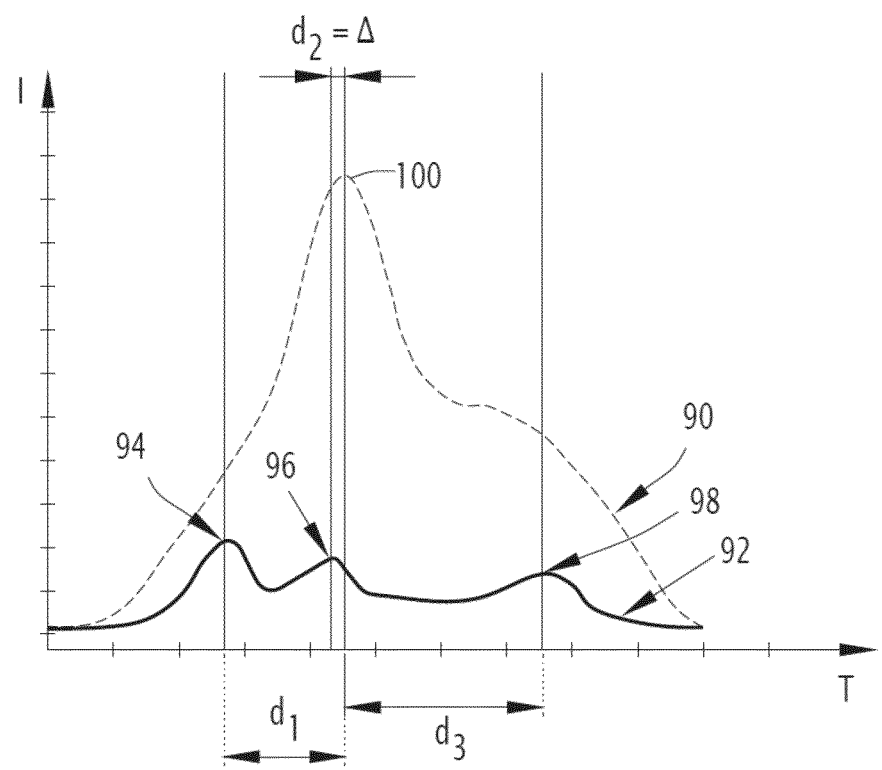
Figure 7:
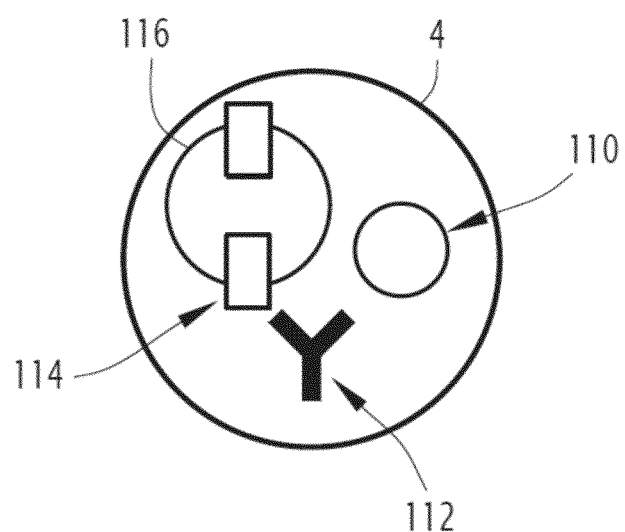
Figure 8:
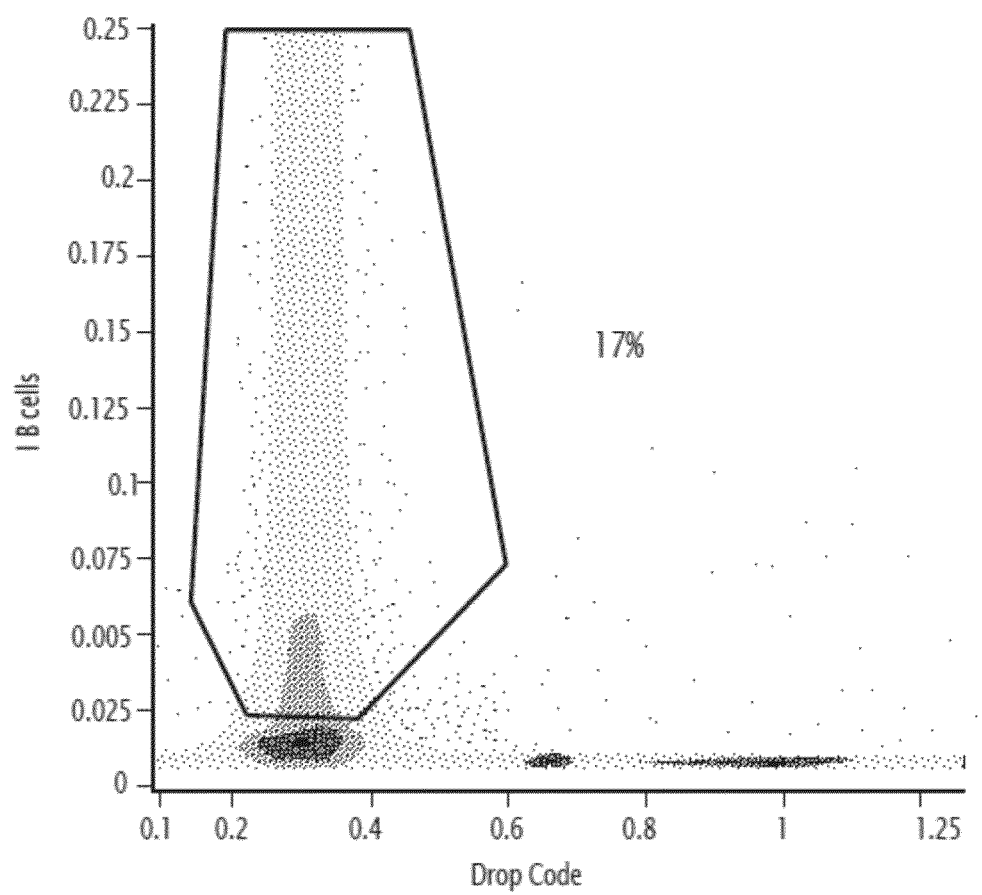
Figure 9:
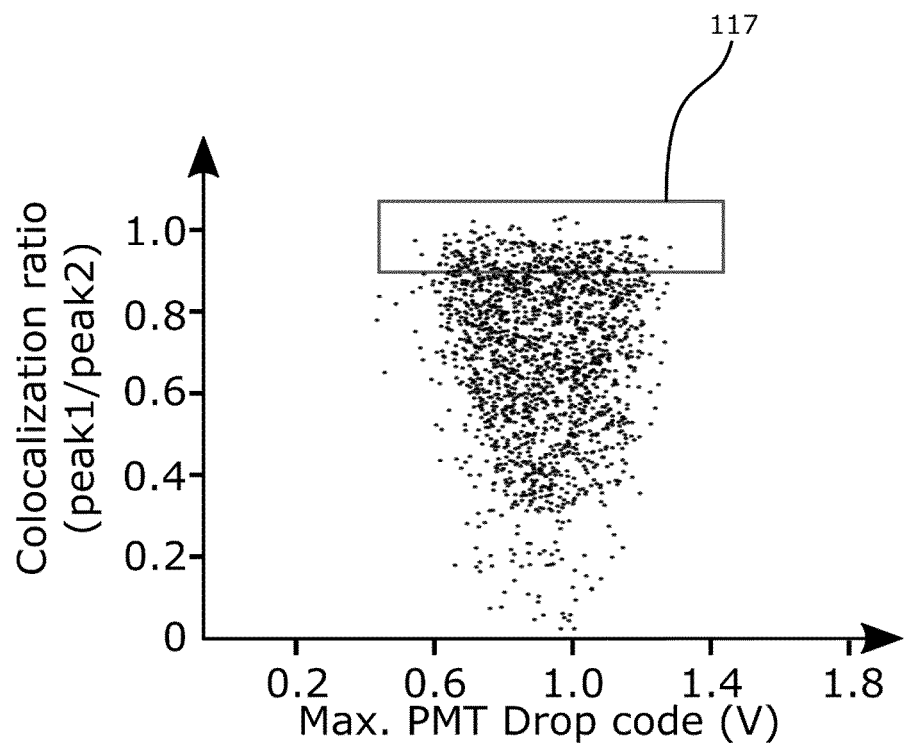
Figure 10:
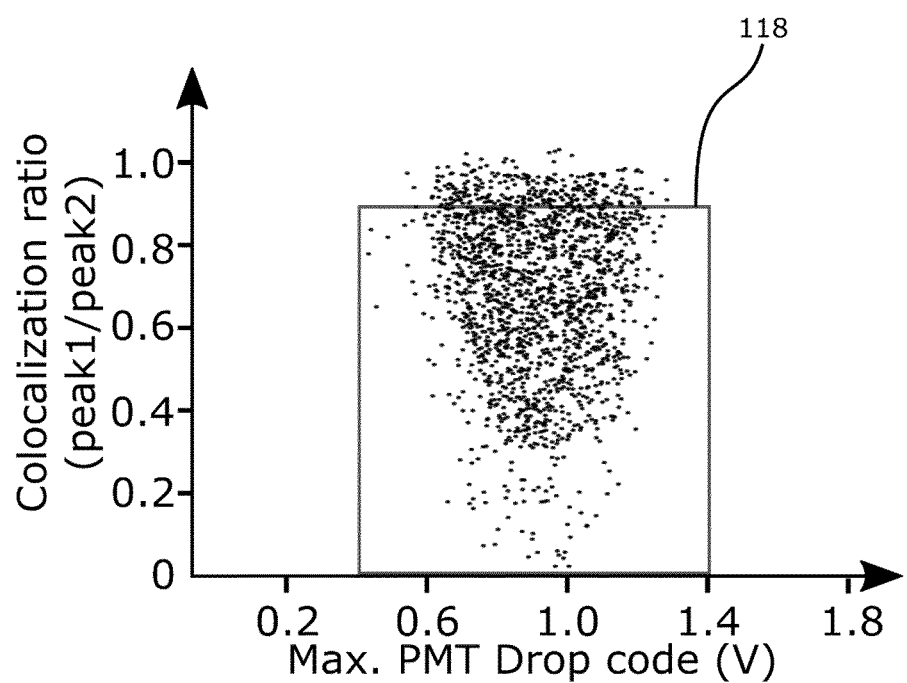
Figure 11:
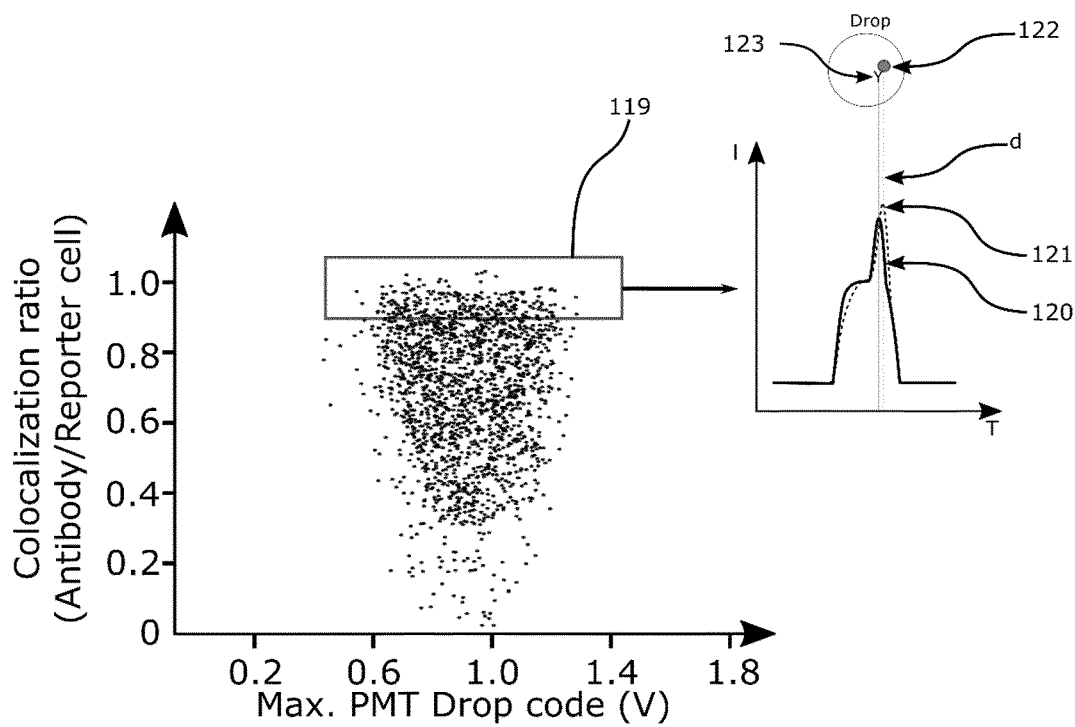
Figure 12:
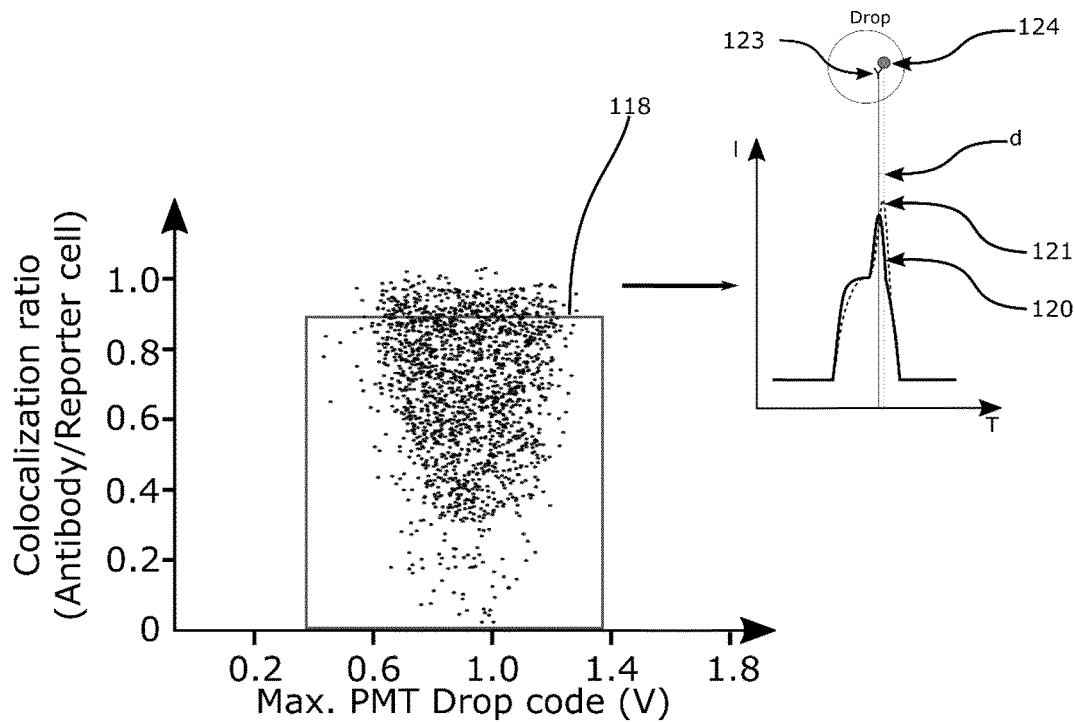
Figure 13:
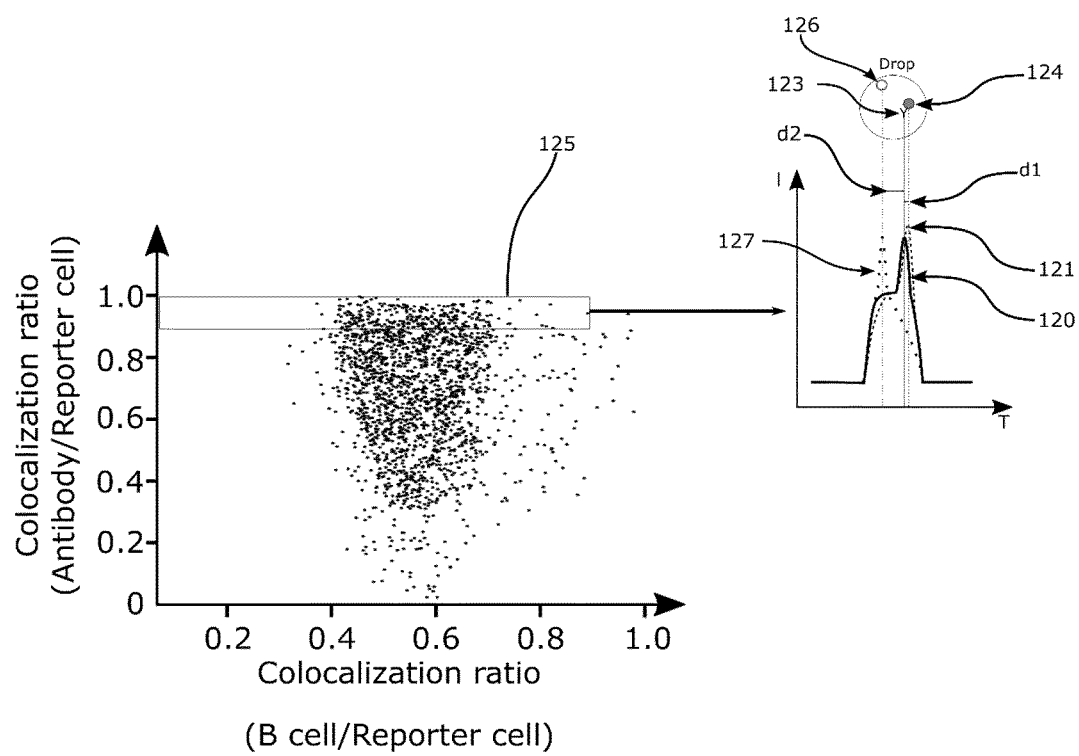

FIG. 5 is an example of curves of measurement of two optical signals for a droplet wherein a co-localization parameter calculation is illustrated, FIG. 6 is an example of curves of measurement of two optical signals for a droplet wherein a multipeak co-localization parameter calculation is illustrated, FIG. 7 is a schematic representation of a sample droplet used in a bio-assay, FIG. 8 is an example of dot plot representing the droplets according to two parameters and a selecting gate, FIG. 9 is an example of the dot plot representing the droplets according to selected co-localization parameter set above 90% confidence interval, for selecting co-localization events of soluble fluorescently labeled antigen and fluorescently labeled antibody, FIG. 10 is an example of the dot plot representing the droplets according to selected co-localization parameter set below 90% confidence interval, for excluding co-localizations events, FIG. 11 is an example of the dot plot and droplet signal representing the droplets according to selected co-localization parameter set above 90% confidence interval, for selecting co-localization events of soluble fluorescently labeled reporter cell and fluorescently labeled antibody, FIG. 12 is an example of the dot plot and droplet signal representing the droplet signal according to selected co-localization parameter set below 90% confidence interval, for excluding co-localizations events of soluble fluorescently labeled antibody producing cell and fluorescently labeled antibody, FIG. 13 is an example of the dot plot and droplet signal representing the droplets according to antibody/reporter cell co-localization parameter set above 90% confidence interval and excluding antibody producing cell/reporter cell co-localization by setting the parameter below 90% confidence.

Figure 1:
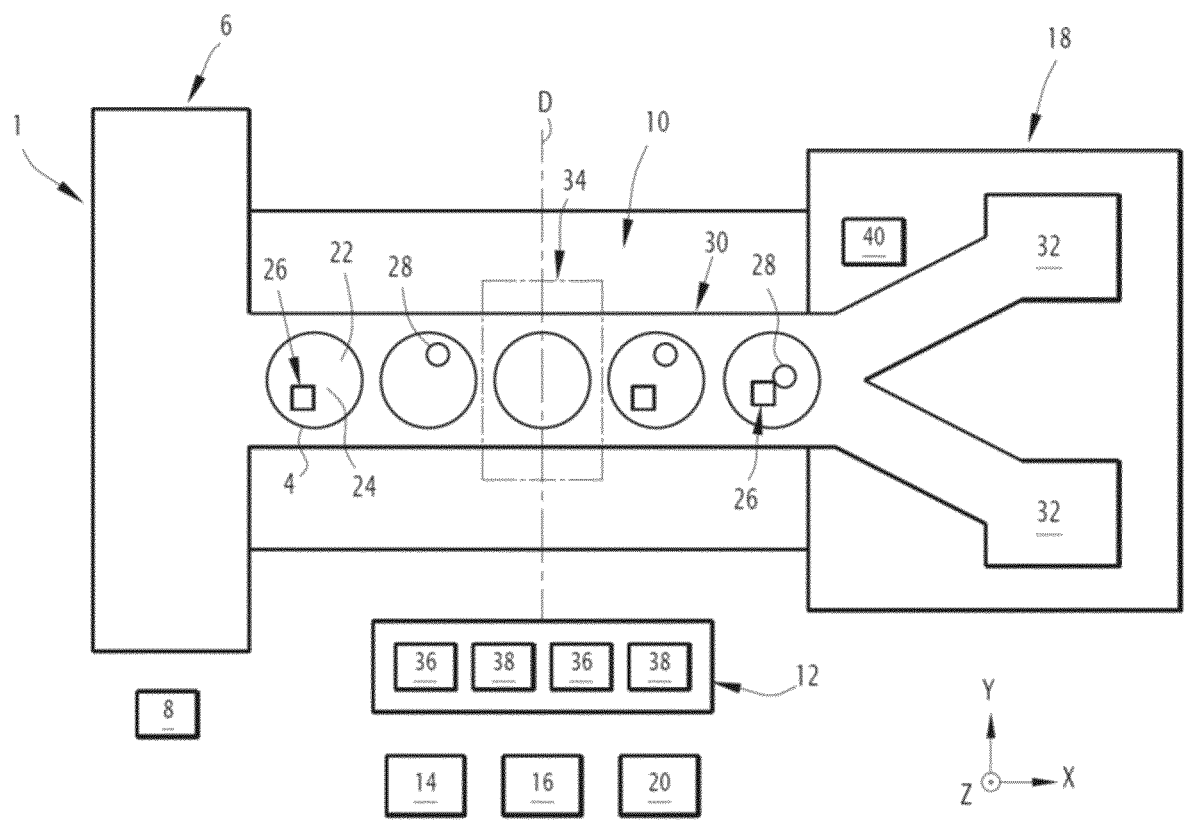
FIG. 1 is a schematic view of an apparatus according to the invention.

An apparatus 1 for analyzing and selecting a specific droplet among a plurality of droplets 4 according to the invention is shown in FIG. 1.

The apparatus 1 comprises a droplet supply 6, a controller 8, a droplets support 10, a detection assembly 12, a calculator 14, a selecting unit 16 and a sorting unit 18.

Advantageously the apparatus further comprises a monitor 20, with a man machine interface.

The droplet supply 6 is intended to provide a plurality of droplets 4 dispersed in a carrier fluid 22.

In the embodiment of FIG. 1, the plurality of droplets 4 is a succession of droplets 4.

The droplets 4 contain an inner fluid 24 immiscible with the carrier fluid 22. By "immiscible" it is generally meant that less than 0.01% of the inner fluid 24 is able to dissolve in the carrier fluid 22 at 25° C. and ambient pressure. For example, the inner fluid 24 is an aqueous solution and the outer fluid 22 is a carrier oil.

For example, the inner fluid 24 contains at least a biological entity and a medium, which is loaded in the inner fluid 22 before forming each droplet 4. For example, the biological entity is a cell.

The content of the droplets 4 of the plurality of droplets 4 can be different.

Advantageously, at least a droplet 4 of the plurality of droplets 4 comprises a first element 26, being fluorescent in a first wavelength channel. At least a droplet 4 of the plurality of droplets 4 comprises a second element 28, being fluorescent in a second wavelength channel. Each fluorescent element 26, 28 is characterized by an excitation spectrum and an emission spectrum.

The wavelength channels of the excitation maxima are usually separated by at least 70 nm.

Advantageously, the first and second element 26, 28 are chosen in the group of elements consisting of a cell, a fluorescently labelled protein, a cell labelling reagent, a fluorescently labeled antigen, a fluorescently labelled antibody, a particle coated with a biological entity, a nucleic acid, a peptide and a chemical drug.

The particle can be a solid particle or a soft particle. For example, the particle is a magnetic particle, a colloidal particle, an hydrogel bead, a vesicle, a liposome, a droplet or other.

The second element is for example adapted to bind the first element. For example, the first element is a fluorescently labeled antigen and the second element is a fluorescently labelled antibody.

In reference to FIG. 1, the droplet support 10 is a chip, onto which a microfluidic pattern is formed. The droplets support 10 is preferably made in one piece of a single material, in particular a polymeric material such as polydimethylsiloxane (PDMS) or polymethylmethacrylate (PMMA), polycarbonate (PC), epoxy, in particular photopolymerizable epoxy such as marketed by Norland Optical Adhesives (NOA) or glass.

A shown in FIG. 1, the droplet support 10 comprises at least a working channel 30. The working channel 30 is connected upstream to the supply 6 of the plurality of droplets 4 dispersed in the carrier fluid 22. The working channel 30 is emerging downstream into at least a sorting area 32 of the sorting unit 18.

The working channel 30 is adapted for the measurement of an optical signal in the successive droplets 4.

The droplet support 10 defines a detection area 34 wherein the support 10 is transparent in the wavelength channels used for the detection. In the detection area 34 the working channel is extending along a longitudinal axis X.

The dimension of the working channel 30 in the directions Y and Z transversal relatively to the longitudinal axis X are adapted to the dimension of the droplets 4 such that the droplets 4 of the succession are passing one by one in the detection area 34.

The controller 8 is adapted to control the flowrate of the plurality of droplets 4 within the working channel 30. For example, the controller 8 is connected to the droplet supply 6 to control the injection of droplets 4 and carrier fluid by the droplets supply 6. In addition, the controller 8 allows to control the spacing between droplets 4, the detection time and the frequency of droplets 4 passing through the detection area 34.

The detection assembly 12 is adapted to measure, for a droplet, at least two optical signals, each optical signal being representative of a light intensity spatial distribution in the droplet 4 for an associated wavelength channel.

For example, the detection assembly 12 comprises, at least a light source 36 and at least a visible light sensitive detector 38. For example, the visible light sensitive detector 38 is a photomultiplier.

The light source 36 is adapted to illuminate the detection area 34. For example, the light source 36 is a white source exciting every visible wavelength.

For example, the detection assembly 12 comprises a light source 36 for each optical signal. Advantageously, a light source 36 is adapted to emit a light with a non-zero intensity in specific wavelength channel corresponding to the fluorescence excitation spectrum of a fluorescent element 26, 28 likely to be in at least a droplet 4 of the plurality of droplets. For example, the light source 36 is a laser. For example, the specific wavelength channel is an excitation channel to allow the fluorescence of the first element 26 or the second element 28.

For example, the detection assembly 12 comprises a visible light sensitive detector 38 for each optical signal. Each visible light sensitive detector r 38 is adapted to record a voltage measurement corresponding to the intensity of an optical signal emitted in the detection area 34 according to the time.

Advantageously, each visible light sensitive detector 38 is sensitive to a specific wavelength channel corresponding to the fluorescence emission spectrum of an element 26, 28 likely to be in at least a droplet 4 of the plurality of droplets 4. For example, the wavelength channel associated to the first optical signal comprises the emission spectrum of the first element 26 and the wavelength channel associated to the second optical signal comprises the emission spectrum of the second element 28.

For example, the detection assembly is able to measure optically the intensity of an optical signal along a detection line D, extending along a direction Y perpendicular to the longitudinal axis X of the working channel 30.

The optical signal measurement is taken on the dimension of the droplets 4 when it is passing progressively in the detection area 34.

When the flowrate of the carrier fluid 22 and droplets 4 is known, a measurement of the optical signal obtained on this detection line D during the time corresponds to a spatial scanning of the droplet 4 crossing the detection line D.

The visible light sensitive detectors 38 are arranged to measure their respective optical signal simultaneously on the same detection line D.

Different measurements will be described in reference to FIG. 3, FIG. 4, FIG. 5 and FIG. 6, later in the description.

The detection assembly 12 is connected to the calculator 14.

The calculator 14 is adapted for calculating a plurality of parameters from the at least two optical signals. For example, the calculator 14 comprises a memory and a real-time microprocessor.

The calculator 14 is adapted to retrieve, calculate, interpret the signal in real-time according to the defined criteria.

The defined criteria are then loaded into the calculator unit 14 in order to reduce the time of data transfer and calculation.

The calculator 14 is adapted to increase the throughput of the data analysis and sorting.

The memory comprises a plurality of software modules which can be executed to carry out the calculations of the parameters by the processor.

The plurality of parameter comprises the coordinate of the maximum for each optical signal and a co-localization parameter and the at least two calculated parameters comprises the co-localization parameter.

Different parameters and the method to calculate them will be described later in the description.

The calculator is connected to the detection assembly 12 and the selecting unit 16.

The selecting unit 16 is adapted for determining a sorting class for a droplet 4 according to at least two calculated parameters. For example, the selecting unit 16 comprises a memory and a microprocessor.

For example, the selecting unit 16 comprises a plurality of software modules which can be executed to carry out to compare a calculated parameter to a threshold value. The sorting criteria will be described later in the description.

The selecting unit 16 is connected to the calculator 14 and the sorting unit 18.

The sorting unit 18 is adapted for sorting the droplet 4 according to their sorting class when the droplets 4 in different sorting area 32. For example, the sorting unit 18 comprises a different sorting area 32 for each sorting class. Each sorting area 32 is connected to the working channel 30. Moreover, the sorting unit 18 comprises an orientating mean 40 to orient the droplet 4 in each sorting area 32 according to the sorting class of the droplet 4. For example, the orientating mean 40 comprises electrodes, or flow controller.

The monitor 20 is adapted to display of the measurements on graphs and to allow setting parameters for the calculation or the sorting criteria.

For example, the monitor 20 is adapted to display dot plots representing the droplets 4 according to two different parameters. A dot plot is represented on FIG. 8.

The monitor 20 is connected to the controller 8, the detection assembly 12, the calculator 14, the selecting unit 16 and/or the sorting unit 18.

Figure 2:
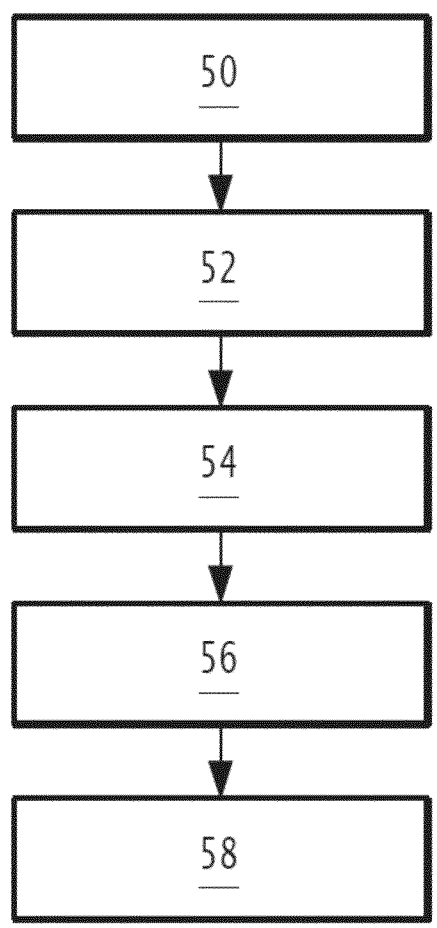
FIG. 2 is a schematic summarizing the steps for a method according to the invention.

A method for analyzing and selecting a specific droplet 4 among a plurality of droplets 4 using the apparatus 1 will now be described in reference to FIG. 2.

The method comprises a providing step 50, a measuring step 52, a calculating step 54, a determining step 56 and a sorting step 58.

During the providing step 50, a plurality of droplets 4 is provided at the entrance of the working channel 30 by the supply 6.

The droplets 4 are circulated into the working channel 30, the controller 8 controlling the flowrate of the carrier fluid 22 and droplets 4.

The droplets 4 arrive successively in the detection area 34 in front of the detection assembly 12.

During the measuring step 52, the droplet 4 in the detection area 34, is illuminated by the detection assembly 12 and at least two optical signals are measured by the detection assembly 12 while the droplet 4 is passing through the detection area 34.

Each optical signal is representative of a light intensity spatial distribution in the droplet for an associated wavelength channel.

During the calculating step 54, several parameters are calculated from the measured optical signals by the calculator 14.

In particular, during the calculating step 54, the calculator 14 calculates a plurality of parameters from the at least two optical signals, wherein the plurality of parameters comprises the coordinates of a maximum for each optical signal and a co-localization parameter.

Advantageously, the calculator 14 further calculates other parameters, as described hereafter.

For each optical signal taken alone, the calculator 14 can calculate:
- a droplet 4 width,
- the coordinates of a maximum for the optical signal,
- the coordinates of a global maximum for the optical signal,
- the coordinates of a local maximum for the optical signal,
- the calculation of the derivative of the optical signal,
- the calculation of the second derivative for the optical signal,
- the number of local maxima in a droplet 4 for the optical signal,
- an integration of the optical signal,
- a ratio between a maximum value of the optical signal and the integration value of said optical signal.

Moreover, for a succession of droplets, for each optical signal taken alone the calculator 14 can calculate the distance between two successive droplets.

Figure 3:
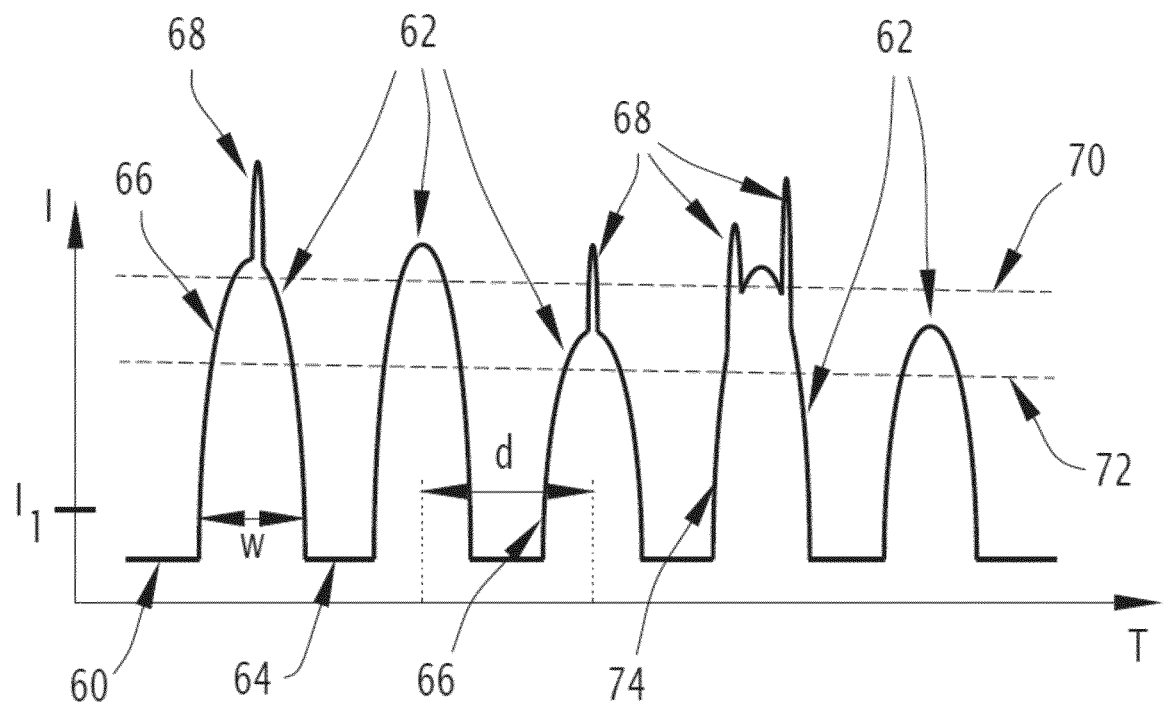
FIG. 3 is an example of curve of measurement of an optical signal for a succession of droplets.

In reference to the FIG. 3, we will explain how these parameters are calculated. In reference to FIGS. 4 and 5, the calculation of a co-localization parameter will be explained. Then in reference to FIG. 6, the calculation of a multipeak co-localization parameter will be explained.

The FIG. 3 shows an example of measurement obtained for a series of successive droplets 4 passing successively through the detection line D for one optical channel corresponding to a first wavelength channel. For example, this signal is measured on a first visible light sensitive detector 38.

The time is represented in abscissas, and the intensity is represented in ordinates.

In the example of FIG. 3, the curve 60 corresponds to the first optical signal.

For example, the first optical signal is measured in a green wavelength. The wavelength is for example associated to a first element 26 being a labelled CHO cell (Chinese hamster ovary cells) used in a test. For example, the CHO cells are stained with Calcein AM. The Calcein AM is known to become a green fluorescent when digested by living cells. The presence of a high peak of fluorescence indicates that there is alive CHO cell in the droplet 4.

The curve 60 is a continuous signal comprising a plurality of successive bell curves 62.

Each bell curve 62 corresponds to the emission collected by the visible light sensitive detector 38 from a different droplet 4 passing in the detection area 34. There is a residual signal observed for each droplet 4, for example, because the droplet 4 has a refractive index different from the carrier phase 22. In alternative, the inner fluid 24 of the droplet 4 comprises an autofluorescent medium that add a residual signal.

The width w1 of the bell curve 62 measured at a predetermined intensity level I1, indicates the width of the associated droplet 4. The width of the droplet can be used for further calculation to normalize the distance.

The baseline 64 between the bell curves 62 represents the emission collected by the visible light sensitive detector 36 by the carrier phase 22 between two successive droplets. It has a lower intensity than the signal measured within the droplet 4.

The distance d between the centers of two successive bell curves 62 corresponds to the spacing between the two successive droplets 4 along the X axis.

On the FIG. 3, only some droplets 4 present a maximum peak 68 distinguishable from the bell curve 62. In the example, those droplets 4 correspond to droplets 4 containing an alive CHO cell.

For example, to determine the coordinate of the maximum, the optical signal is approximated by an interpolation function by the calculator 14. Then the first derivate of the function is calculated by the calculator. The second derivate of the function is calculated by the calculator. The second derivate indicates the curvature of the function. A local maximum is a point where the first derivate is zero and the second derivate is negative.

The coordinates of the maximum peak 68 are memorized by the calculator.

In some assays, the intensity of the maximum peak can, for example, be used to calculate the concentration of the associated element in the droplet. The position of the maximum peak is used for the determination of co-localization parameters as it will be explained below in reference to FIGS. 4, 5 and 6.

The calculator 14 comprises several filters to avoid false local maximum detection that are due to noise. The filters are based on value of peak width threshold, peak height threshold or peak excursion criteria. These values can be predetermined or settled by the user.

A global maximum is the highest maximum value as a function of intensity.

Moreover, as this signal is continuous it is possible to integrate this signal for each bell curve 62. For example, the signal is integrated between two threshold lines 70, 72 represented in the FIG. 3. For example, the threshold lines 70, 72 are predetermined by the user manually or automatically by a software module. In alternative or in addition, the value can be changed manually by the user via the monitor 20.

This integration value can be used for further calculation to normalize the intensity measured. For example, the calculator can calculate a ratio between a maximum value of the optical signal and the integration value of said optical signal.

On FIG. 3, a droplet 74 presents two maximum peaks. In the example, the droplet 74 contains two alive CHO cells. In those droplets 4 two maximum coordinates are calculated.

The detection of multi-peak and calculation of their coordinates and area is particularly advantageous to detect elements for which the loading is dependent on a Poisson distribution, such as particles. The particles are for example cells. Some droplets 4 contain no particles, some droplets 4 contains only one particle, and the other more than one particle. The determination of the number of maximum peak for a channel allows knowing the number of particles associated with this wavelength in the droplet. It can be particularly interesting for assays wherein the results are dependent on the number of particles. It is particularly important to distinguish these droplets 4 for single cell assays.

Figure 4:
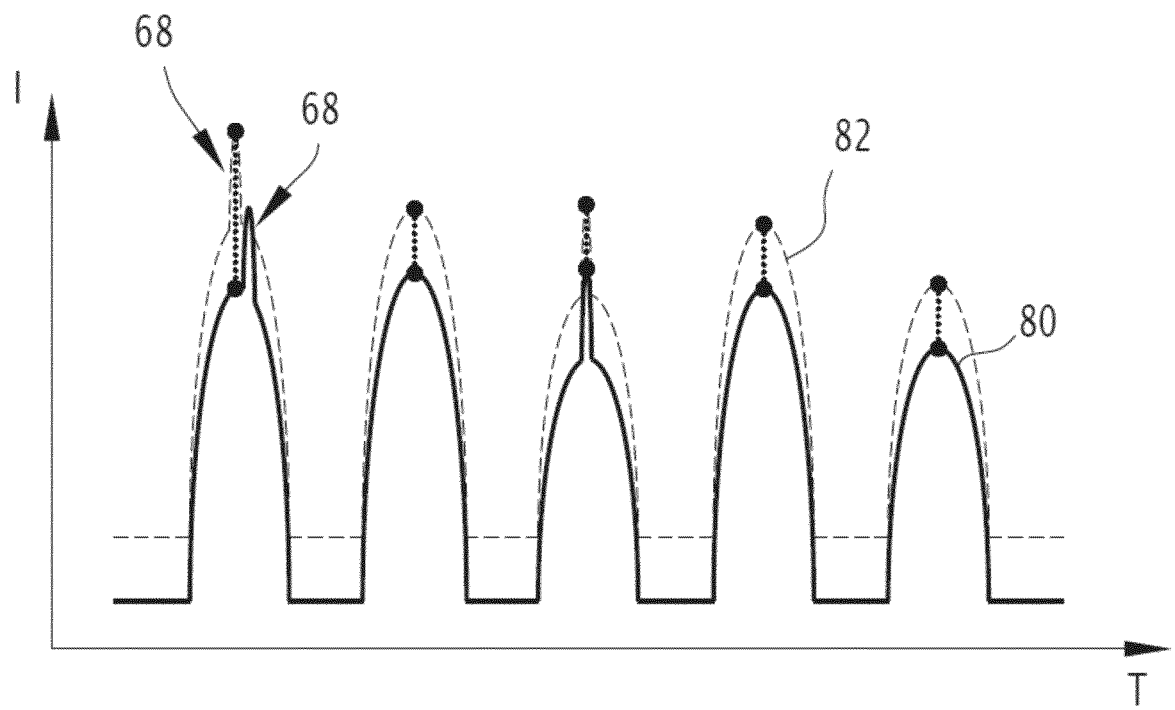
FIG. 4 is an example of curves of measurement of two optical signals for a succession of droplets.

FIG. 4 shows another example of measurement obtained for a series of successive droplets 4 passing successively through the detection line D for two optical channels corresponding to a first wavelength channel and a second wavelength channel.

Each optical signal is represented with a different curve 80, 82. For example, the curve 80 represented with a continuous line is measured on a first visible light sensitive detector 38 and corresponds to the first optical signal associated to a first element 26. The curve 82 represented in dotted lines on FIG. 4 is measured on a second visible light sensitive detector 38 and corresponds to the second optical signal, associated to a second element 28. Each signal is measured in a different fluorescence channel.

The calculator can calculate for each optical signal, the parameters described above in reference to FIG. 3.

Moreover, by comparing the two optical signals, the calculator calculates a co-localization parameter. The calculation is explained in more detail by reference to FIG. 5.

FIG. 5 illustrates the measurement for one droplet for the two signals in more details.

The calculator calculates the coordinates of a maximum 84, 86 for each optical signal in the droplet.

Then, the calculator 14 calculates the distance $\Delta$ between the position corresponding to the maximum intensity of the first optical signal and the position corresponding to the maximum intensity of the second optical signal. This distance $\Delta$ is a co-localization parameter.

The lower the distance $\Delta$ is, the more the elements 26, 28 associated to the optical wavelength are close.

Advantageously, the calculator normalizes the co-localization parameter by the droplet width.

After the normalization, if the co-localization between the elements is ideal the co-localization parameter is equal to 1. After the normalization, if there is no co-localization, the co-localization parameter is equal to 0.

A co-localization parameter is useful to detect binding between two elements 26, 28. Indeed, for example if a fluorescent antigen is bonded to a fluorescent antibody in a droplet, the co-localization parameter associated to the signal of the antigen and the signal of the antibody will be high.

The co-localization parameter can be represented as a dot plot format as a function of the max. peak of the dropcode (V) or any other parameter (droplet width, second co-localization parameter). Typical example, is shown in FIG. 9, where a confidence interval is defined 117. In some embodiment the confidence interval is defined for targeting the highest probability 119 of true co-localization of two events. In the given example, the confidence interval (determining labelled-antigen and labelled secreted antibody), is advantageously set between 90% and 100%, in order to precisely select the droplets having signal with the minimal distance d between the antigen (peak1) 122, 120 and the antibody (peak2) 122, 121. According to a preferred embodiment of the present invention, the co-localization parameter (A) is selected by having a confidence interval ranging from 90% to 100%.

Another application, described in FIG. 10, is selection of co-localization event of fluorescently labelled antibody 123 binding to fluorescently labelled reporter cells 122.

In some other embodiment the co-localization parameter is used as an exclusion criterion. The confidence interval represented in FIG. 10 is set to specifically select the droplets below the 90% of probability for two peaks being co-localized 118. This feature is particularly important for excluding non-specific binding events. Typical example includes case where fluorescent antibody 123, 120 is co-localized with fluorescently labelled antibody producing cells 124, 121.

In some other embodiment, described in FIG. 13, the co-localization parameters are used in combinations or exclusion modes. Typical example is the exclusion of false positive hit and/or fine selection of given droplet population of interest. In a given example, droplets are selected if two signals co-localized but a third one has to be excluded. Typical case is where fluorescent antibody 123, 120 is co-localized with fluorescently labelled antibody producing cell but not on fluorescently labelled reporter cells 126, these two co-localization events are thus excluded. Another typical case is where fluorescent antibody 123, 120 is co-localized with fluorescently labelled reporter cells 124, 121 and should not co-localize with fluorescently labelled antibody producing 126, 127.

In another example during the measuring step, at least three optical signals are measured, and a plurality of co-localization parameters is calculated by comparing the position of the maximum of the optical signals two by two.

FIG. 6 shows another example of measurement obtained for a unique droplet 4 passing through the detection line D for two optical channels corresponding to a first wavelength channel and a second wavelength channel.

This example is for illustrating the calculation of multi-peak co-localization parameter between a first optical signal and a second optical signal, one of them comprising a plurality of local maxima.

Each optical signal is represented with a different curve 90, 92. For example, the curve 90 represented with a continuous line is measured on a first visible light sensitive detector 38 and corresponds to the first optical signal associated to a first element 26. The curve 92 represented in dotted lines on FIG. 4 is measured on a second visible light sensitive detector 38 and corresponds to the second optical signal, associated to a second element 28. Each signal is measured in a different fluorescence channel.

In this example, the first optical signal comprises three local maxima 94, 96, 98 and the second optical signal comprises a local maximum 100.

The calculator calculates the coordinates of the plurality of local maxima 94, 96, 98 for the first optical signal and the coordinates of the local maximum 100 of the second optical signal.

The calculator calculates the multipeak co-localization parameter between the first optical signal and a second optical signal, with the following steps:
- for each local maximum 94, 96, 98 of the first optical signal, the calculator calculates an intermediate co-localization parameter d1, d2, d3, by comparing the position of the local maximum 100 of the second signal to the position of said local maximum 94, 96, 98 of the first optical signal,
- then the calculator 14 compares the intermediate co-localization parameters d1, d2, d3, the multipeak co-localization parameter 1 being the lowest intermediate co-localization parameter.

In the example, three intermediate co-localization parameters d1, d2, d3, are calculated. It appears that the central local maximum 96 is the closest to the local maximum 100 of the second optical signal. The multipeak co-localization parameter 1 is the intermediate co-localization parameter d2 calculated between the central local maximum 94 and the local maximum 100 of the second optical signal.

Advantageously, during the calculating step 54, the calculated parameters are stored in a memory for the determining step 56 and/or for further utilization.

During the determining step 56, the selecting unit 16 decides a sorting class for a droplet 4 according to at least two calculated parameters, comprising at least a co-localization parameter.

The number of sorting class depends on the assay and the possibility of the sorting unit. There is at least two sorting class.

For example, a sorting class is a class of droplets 4 to keep. For example, a sorting class is a class of droplets 4 to exclude. For example, a sorting class is a class of sample droplets; a sorting class is a class of positive control droplets 4 or a class of negative control droplets.

Advantageously, during the determining step 56, the calculated parameters are compared to selection criteria or threshold values. Advantageously, during the determining step, at least a calculated parameter is compared to predetermined threshold values. In alternative or in addition, some thresholds are determined manually by a user via the monitor. The criteria used in the determining step 56 can be adapted to the assay.

For example, for a selection on two parameters, a dot plot is represented on the screen of the monitor 20. To fix the thresholds for two specific parameters simultaneously, the user can draw a selecting gate around the selected or excluded droplets 4 in the associated dot plot via a human machine interface as illustrated on FIG. 8.

For example, the determining step 56 comprises several steps each selection step corresponding to a selection based on different criteria. Each parameter calculated by the calculator can be used for the selection. The sorting class of a droplet is attributed after each selection step planned for the assay.

Advantageously, the user can change the number and type of selection steps via the monitor 20. In alternative, the number and type of selection steps are memorized in the selecting unit 16 for a type of assay.

Advantageously, the calculating step 54 and the determining step 56 can be performed in parallel.

For example, the calculator 14 will stop performing calculation on excluded droplets. It helps the method to be more rapid by avoiding useless calculation.

In alternative all calculation steps are performed before the determinations steps.

Some example of selection criteria will be described hereinafter.

For example, in a step the selecting unit limits the population of droplets 4 to droplets 4 with a high co-localization between two elements 26, 28 in the droplet 4. This selection is based on the co-localization parameters between the two signals associated to the respective element 26, 28. This selection is useful for example to select droplets 4 where a binding between the two elements 26, 28 occurs.

In alternative or in addition, the selecting unit rejects from the selected population the droplets 4 with a high co-localization between two elements in a droplet. This selection is useful for example to reject droplets 4 where there is a binding between the two elements. For example, such a rejection is useful to exclude droplets 4 containing aggregates of cells. For example, if an antibody is bound on the surface of the secreting cell, it will be difficult to analyze the antibody specificity for an antigen.

For example, in a step, the selecting unit 16 limits the population of droplets 4 to droplets 4 with a correct width.

For example, in a step, the selecting unit limits the population of droplets 4 to droplets 4 containing an element. This selection is based on the intensity value of the global maximum peak for the associated signal and on the ratio between the maximum value of the optical signal and the integration value of said optical signal. For example, the droplets 4 which are in a threshold gate for the intensity value of the global maximum peak for the associated signal and the ratio between the maximum value of the optical signal and the integration value of said optical signal are kept.

Then during the sorting step 58, the sorting unit 18 sorts the droplets 4 according to their sorting class. Each droplet 4 is oriented to a sorting area 32 associated to its sorting class.

It is then possible to collect the droplets 4 or their content for further reaction or analysis.

Furthermore, advantageously, the optical signals, each parameter calculated and/or each sorting criteria are memorized. Therefore, it is possible to use these data for further analysis.

Furthermore, the method advantageously comprises the step of capturing a picture of the droplet 4 during the measuring step. For example, the picture is a snapshot of the sorted droplet 4. For example, the picture is a one dimensional plot of the droplet 4 of interest.

A more specific example of application will now be described to illustrate the advantages of the invention.

The following example illustrates the droplets 4 can be sorted according to several criteria. The example is illustrated by the FIGS. 7 and 8.

The goal of this assay is to recover specifically droplets 4 with antibody producting cells 110 able to produce an antibody 112 that can bind to a surface target 114 of a CHO (Chinese hamster ovary) cell 116. Such a droplet is schematically represented on FIG. 7. It is therefore necessary to recover the droplets 4 where the antibody 112 signal co-localizes with the target 112 but not with the B cells 116, the droplet containing both a CHO cell 114 and a B cell 110.

In the assay, the CHO cells are stained with Calcein AM. The CHO cell used for the assay comprises at their surface a target antigen. The B cells are stained with Calcein AM Violet.

Every droplets 4 of the assay comprises a droplet staining such as sulforhodamine B, and a labelled antibody detection reagent, for instance an anti-mouse IgG Fc AlexaFluor647.

In the example of FIGS. 7 and 8, the succession of droplets 4 comprises a plurality of positive control droplets, then a plurality of negative control droplets, and finally a plurality of sample droplets.

The calculator 14 associates a drop code to each droplet 4 depending on the order where it passes in the detection area 34. A predefined drop code corresponds to the droplet of the plurality of sample droplets.

The positive control droplets 4 comprise of a CHO cell and an antibody known to be able to bind the target. The negative control droplets 4 comprising of an aqueous medium, but do not comprise a CHO cell nor a B cell.

Four optical signals are measured by the detection assembly simultaneously.

For simplicity of explanation, the optical signal associated to the CHO calcein AM stain is called green signal, the optical signal associated to the B cells calcein AM violet stain is called violet signal. The optical signal associated to the drop code is called orange signal. The optical signal associated to the antibody binding detection reagent is called red signal.

From the orange signal, the calculator calculates the droplets 4 widths. From the red signal, the calculator calculates the coordinates of the local maxima, called hereinafter binding maxima. From the violet signal, the calculator calculates the coordinates of the local maxima, called hereinafter B cell maxima. From the green signal, the calculator calculates the coordinates of the local maxima, called herein after CHO maxima.

During the determination step, every droplet presenting a droplet width higher than a specific threshold or lower than another specific threshold is rejected by the selecting unit. With these criteria, signal due to impurities or droplets 4 difficult to screen and analyze because of their dimension are not kept. These droplets 4 and impurities can come from emulsion instability or the spontaneous coalescence of a plurality of successive droplets 4.

During the determination step, among the remaining droplets, every droplet presenting, for the red signal, corresponding to the antibody binding reagent, an intensity for a binding maximum higher than a threshold which is associated with a sorting class to keep and the other are associated to a class to separate. For example, the threshold is 0.1 in an arbitrary unit based on background fluorescence and the positive control droplets 4. After this step the negative control droplets 4 are in the class to separate and the positive control droplets are in the sorting class. The sample droplets 4 can be in the sorting class or in the class to separate, but only the sample droplets 4 being in the sorting class can be selected as positive at the end of the determining step. With this criterion, every droplet containing the antibody that is specific to the target is kept in the sorting class. In an example, with this criterion only 0.16% of sample droplets 4 were kept in this sorting class.

For the violet signal, corresponding to the B cells, the selecting unit 16 associates every droplet presenting a maximal intensity under a specific threshold to another class to separate. In complement or in alternative, the selection is made by a dot plot gating as represented in FIG. 8. The dot plot represents the droplets 4 according to the intensity of B cells maxima and to the drop code. The gate includes the droplets 4 with a low drop code and with a B cell maximum intensity comprised between 0.01 V and 5 V. With this criterion, the droplets 4 without B cells are excluded. For example, after this selection only 17% of droplets 4 are kept in the sorting class.

For the green signal, corresponding to alive CHO cells, every droplet in the class to sort presenting a maximal intensity under a specific threshold are associated to another class to separate. The dot plot represents the droplets 4 according to the intensity of CHO cells maxima and to the drop code. The gate includes the droplets 4 with a low drop code corresponding to the sample series and with a CHO cell maximum intensity comprises between 0.01 V and 5 V. With this criterion, the droplets 4 without CHO cells are not kept. For example, with this selection only 70% of droplets 4 remains in the sorting class.

In alternative or in complement, the selection on the violet signal and the green signal are made simultaneously. A dot plot representing every droplet according to the CHO maximum intensity and the B cell maximum intensity is displayed on the monitor. The gating is made such that every droplet 4 kept in the class to sort has both a CHO cell and a B cell.

After that the co-localization parameter between the green signal, corresponding to the CHO cells and the red signal corresponding to the binding are calculated for the remaining droplets.

Furthermore, the co-localization parameter between the violet signal, corresponding to the B cells and the red signal corresponding to the binding are calculated for the remaining droplets. Furthermore, the co-localization parameter between the violet signal, corresponding to the B cells and the green signal, corresponding to the CHO cells are calculated for the remaining droplets.

Then during a determining step 56, the droplets 4 with a high co-localization parameter between the red signal and CHO cells are kept in the sorting class.

Then the droplets 4 with a high co-localization parameter between the detection reagent and B cells are rejected.

Finally, the droplets 4 with a high co-localization parameter between the CHO cells and B cells are rejected. In this example, if the CHO cell co-localizing with a binding reagent is also co-localizing with a B cell, the droplets 4 are excluded because it can be a false positive. Indeed, the B cells may have secreted antibody that are not bound to the target but detected by the binding agent.

This leads to a specific population of droplets 4 in the sorting class comprising exclusively droplets 4 with B cells able to produce an antibody that can bind to a surface target of a CHO cell.

Then the droplets 4 were sorted based on their sorting class.

At each step of selection, the excluded droplet can be associated to a different sorting class. It allows performing several analyses on the droplets 4. For example, the positive control droplets 4 can be recovered for the following analysis.

The invention provides a method for analyzing and selecting a specific droplet with a higher fidelity than existing systems. Indeed, it is possible to sort the droplets 4 according to multiple criteria. The co-localization parameters combined with other parameters are useful to analyze the spatial relative positions of elements, which can have an influence on assay results.

In another embodiment, the plurality of droplets 4 is an emulsion. The droplets 4 are stored in a microfluidic chamber, wherein the measurement step is performed. The detection assembly 12 is adapted to scan spatially each droplet 4 in the chamber so as to measure the light intensity distribution for a wavelength channel.

The invention claimed is:

1. A method for analyzing and selecting a specific droplet among a plurality of droplets, comprising the following steps:

providing a plurality of droplets, for a droplet among the plurality of droplets, measuring at least two optical signals, each optical signal being representative of a light intensity spatial distribution in the droplet for an associated wavelength channel, calculating a plurality of calculated parameters from the at least two optical signals, determining a sorting class for the droplet according to at least two of the plurality of calculated parameters, sorting said droplet according to the sorting class of said droplet, wherein:

the step of calculating the plurality of calculated parameters comprises:

calculating the coordinates of a maximum intensity for each said at least two optical signals and calculating a co-localization parameter by calculating a distance between a coordinate corresponding to a maximum intensity of a first optical signal and a coordinate corresponding to a maximum intensity of a second optical signal, wherein both the first and second optical signals are among said at least two optical signals, one of the at least two of the plurality of calculated parameters used for the determining step comprises the co-localization parameter;

and the step of determining a sorting class includes determining whether or not the co-localization parameter has a confidence interval ranging from 90% to 100%.

2. A method according to claim 1, wherein the plurality of calculated parameters comprises at least one of the following parameters:

a droplet width, an integration of an optical signal, a ratio between a maximum value of an optical signal and an integration value of said optical signal, the coordinates of a local maximum for an optical signal, the number of local maxima in a droplet for an optical signal, the calculation of the derivative of an optical signal, and, the calculation of the second derivative for an optical signal.

3. A method according to claim 1, wherein when a first optical signal comprises a plurality of local maxima, the plurality of calculated parameters comprise a multipeak co-localization parameter calculated between the first optical signal and a second optical signal comprising a local maximum, the multipeak co-localization parameter being calculated with the following steps:

for each local maximum of the first optical signal, calculating an intermediate colocalization parameter, by comparing the position of the local maximum of the second signal to the position of said local maximum of the first optical signal, comparing the intermediate co-localization parameters to select the lowest intermediate co-localization parameter as the multipeak co-localization parameter.

4. A method according to claim 1, wherein the co-localization parameter in a droplet is normalized by the droplet width.

5. A method according to claim 1, wherein the step of measuring at least two optical signals is performed for at least two droplets of the plurality of droplets and the plurality of calculated parameters comprises the spacing between the two droplets.

6. A method according to claim 1 wherein during the determining step, at least a calculated parameter is compared to predetermined threshold values.

7. A method according to claim 1, wherein, during the measuring step, at least three optical signals are measured, and wherein a plurality of co-localization parameters are calculated by comparing the position of the maximum of the optical signals two by two.

8. A method according to claim 1 further comprising the following step:

providing an apparatus comprising a channel adapted for a flow of droplets, the apparatus comprising a detection area, and a sorting area, and wherein the plurality of droplets are circulated in the channel, carrying out a measurement for a droplet flowing in the detection area.

9. A method according to claim 1, further comprising a step of capturing a picture of the droplet during the measuring step.

10. A method according to claim 1, wherein at least a first droplet of the plurality of droplets comprises a first element, the first element being fluorescent in a wavelength channel associated to the first optical signal, and wherein at least a the first droplet of the plurality of droplets comprises a second element, the second element being fluorescent in a second wavelength channel associated to the second optical signal.

11. A method according to claim 10, wherein the first and second elements are each independently a cell, a fluorescently labelled protein, a cell labelling reagent, a fluorescently labeled antigen, a fluorescently labelled antibody, a particle coated with a biological entity, a nucleic acid, a peptide, or a chemical drug.

* * * * *